(12) United States Patent
Shaw

(10) Patent No.: US 6,474,670 B2
(45) Date of Patent: Nov. 5, 2002

(54) BICYCLE BALANCING SYSTEM

(76) Inventor: Mark S. Shaw, 10490 Pierce St. NE., Blaine, MN (US) 55434

( * ) Notice: Subject to any disclaimer, the term of this patent is extended or adjusted under 35 U.S.C. 154(b) by 0 days.

(21) Appl. No.: 09/767,662

(22) Filed: Jan. 22, 2001

(65) Prior Publication Data

US 2002/0096858 A1 Jul. 25, 2002

(51) Int. Cl.[7] .............................................. B62H 7/00
(52) U.S. Cl. ...................... 280/299; 280/298; 280/293; 16/426; 16/427
(58) Field of Search .......................... 280/288.4, 293, 280/298, 292, 755, 299, 300, 301, 302, 303, 304; 403/362, 93, 94, 95, 84, 109.3, 109.2; 16/110.1, 422, 426, 427

(56) References Cited

U.S. PATENT DOCUMENTS

| | | | | |
|---|---|---|---|---|
| 4,605,378 A | * | 8/1986 | Hamilton | 403/84 |
| 5,139,524 A | * | 8/1992 | Aulie et al. | 403/362 X |
| 5,154,096 A | * | 10/1992 | Geller et al. | 280/288.4 X |
| 5,303,944 A | * | 4/1994 | Kalmus | 280/288.4 |
| 5,407,222 A | * | 4/1995 | Harrison | 280/293 |
| 5,487,554 A | * | 1/1996 | May | 280/293 |
| 5,683,093 A | * | 11/1997 | Hayes | 280/293 |
| 5,791,675 A | * | 8/1998 | Fleischer | 280/293 |
| 6,120,050 A | * | 9/2000 | Tillim | 280/293 |
| 6,213,672 B1 | * | 4/2001 | Varga | 403/109.3 X |
| 6,244,612 B1 | * | 6/2001 | Henderson | 280/293 |
| 6,286,850 B1 | * | 9/2001 | Conway | 280/302 |

* cited by examiner

Primary Examiner—F. Zeender

(57) ABSTRACT

A bicycle balancing system for assisting in the training of a child to ride a bicycle. The bicycle balancing system includes a bracket attachable to a post of a bicycle, a connecting tube removably attached to the bracket, an adjustment tube attached to the bracket for adjustably receiving a U-shaped member, and a handle adjustably attached to the U-shaped member. The U-shaped member and handle may be pivoted to a desired position by releasing and connecting at least one locking detent positionable within a plurality of locking apertures within the connecting tube. The handle may be extended outwardly by releasing a locking detent positionable within a plurality of locking apertures.

8 Claims, 7 Drawing Sheets

BICYCLE BALANCING SYSTEM

BACKGROUND OF THE INVENTION

1. Field of the Invention

The present invention relates generally to bicycle training aids and more specifically it relates to a bicycle balancing system for assisting in the training of a child to ride a bicycle.

2. Description of the Prior Art

Bicycle training aids have been in use for years to help children and adults learn to ride bicycles. The most common type of bicycle training aid is commonly referred to as "training wheels". Training wheels are typically comprised of a pair of adjustable wheels attached to the ends of the rear axle to support the bicycle in an upright position while the child is learning to ride the bicycle.

The main problem with conventional training wheels for bicycles is that they do not allow for the bicycle to function and move as a bicycle without training wheels thereby making it difficult for the child to graduate from utilizing training wheels upon their bicycle. Another problem with conventional training wheels is that they allow the child to travel anywhere they desire with limited control by the parent or guardian.

While these devices may be suitable for the particular purpose to which they address, they are not as suitable for assisting in the training of a child to ride a bicycle. Conventional bicycle training aids do not provide a realistic environment to learn to balance a bicycle thereby making the children overly dependent upon their usage.

In these respects, the bicycle balancing system according to the present invention substantially departs from the conventional concepts and designs of the prior art, and in so doing provides an apparatus primarily developed for the purpose of assisting in the training of a child to ride a bicycle.

SUMMARY OF THE INVENTION

In view of the foregoing disadvantages inherent in the known types of bicycle training aids now present in the prior art, the present invention provides a new bicycle balancing system construction wherein the same can be utilized for assisting in the training of a child to ride a bicycle.

The general purpose of the present invention, which will be described subsequently in greater detail, is to provide a new bicycle balancing system that has many of the advantages of the bicycle training aids mentioned heretofore and many novel features that result in a new bicycle balancing system which is not anticipated, rendered obvious, suggested, or even implied by any of the prior art bicycle training aids, either alone or in any combination thereof.

To attain this, the present invention generally comprises a bracket attachable to a post of a bicycle, a connecting tube removably attached to the bracket, an adjustment tube attached to the bracket for adjustably receiving a U-shaped member, and a handle adjustably attached to the U-shaped member. The U-shaped member and handle may be pivoted to a desired position by releasing and connecting at least one locking detent positionable within a plurality of locking apertures within the connecting tube, The handle may be extended outwardly by releasing a locking detent positionable within a plurality of locking apertures.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a bicycle balancing system that will overcome the shortcomings of the prior art devices.

A second object is to provide a bicycle balancing system for assisting in the training of a child to ride a bicycle.

Another object is to provide a bicycle balancing system that creates a realistic bicycle riding experience for a child while under the control of a parent.

An additional object is to provide a bicycle balancing system that allows a parent to control the operation of the bicycle being ridden by a child.

A further object is to provide a bicycle balancing system that simultaneously provides exercise to a parent.

Another object is to provide a bicycle balancing system that can also be utilized for individuals learning to ride skateboards, inline skates and the like to have a balancing structure.

A further object is to provide a bicycle balancing system that is adjustable.

An additional object is to provide a bicycle balancing system that can be utilized upon various sizes of bicycles.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DESCRIPTION OF THE PREFERRED EMBODIMENT

Figure 1:
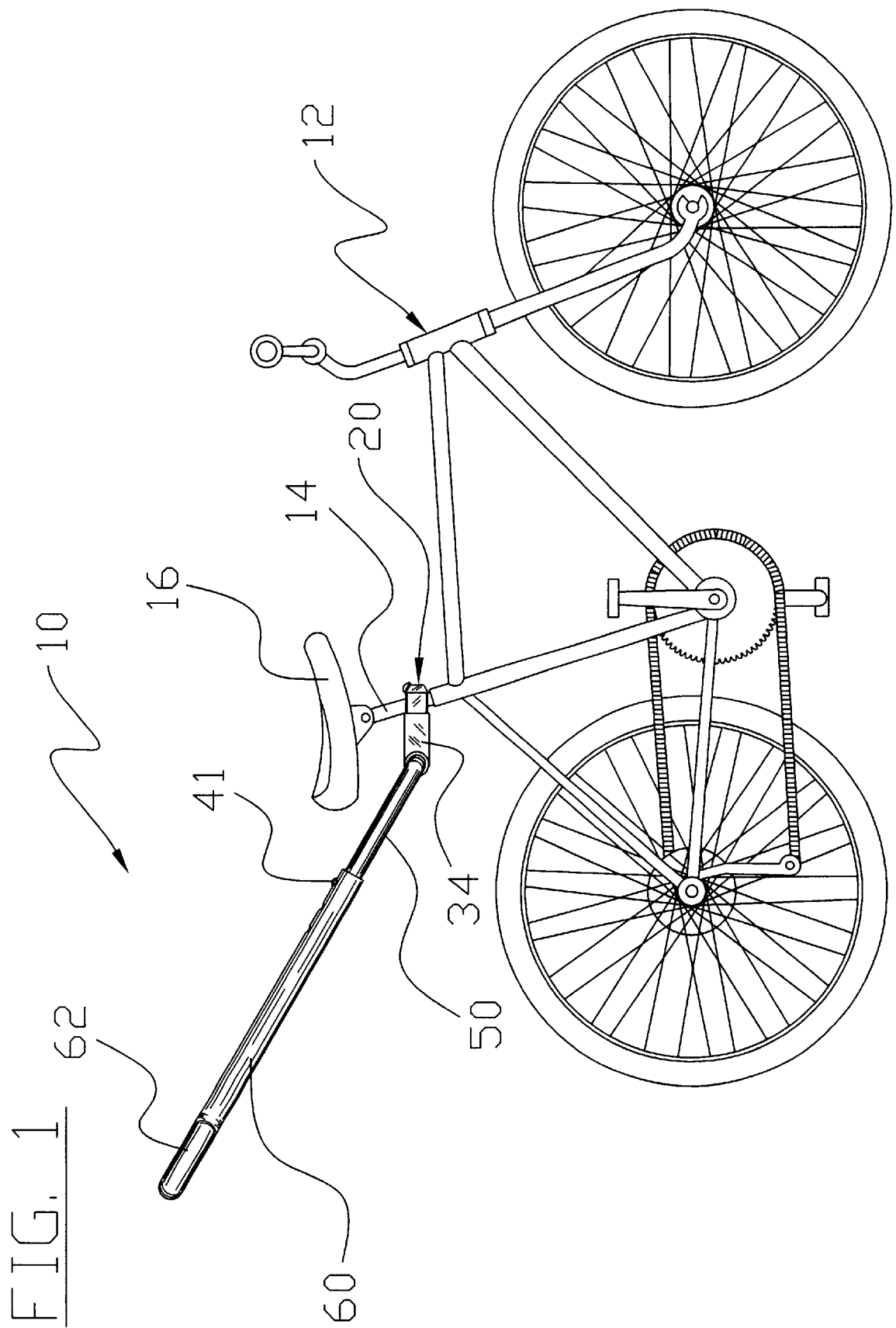
FIG. 1 is a side view of the present invention attached to a bicycle.

Turning now descriptively to the drawings, in which similar reference characters denote similar elements throughout the several views, FIGS. 1 through 7 illustrate a bicycle balancing system 10, which comprises a bracket 20 attachable to a post 14 of a bicycle 12, a connecting tube 34 removably attached to the bracket 20, an adjustment tube 30 attached to the bracket 20 for adjustably receiving a U-shaped member 50, and a handle 60 adjustably attached to the U-shaped member 50. The U-shaped member 50 and handle 60 may be pivoted to a desired position by releasing and connecting at least one locking detent 40 positionable within a plurality of locking apertures 33 within the connecting tube 34. The handle 60 may be extended outwardly by releasing a locking detent 41 positionable within a plurality of locking apertures 32.

As shown in FIG. 1 of the drawings, a conventional bicycle 12 has a frame structure, a front wheel, a rear wheel, and a seat 16 with a post 14 adjustably positioned within the frame for supporting the rider. It can be appreciated that the bicycle 12 and post 14 illustrated within FIGS. 1, 4 and 6 of the drawings are merely an illustration of the usage of the present invention upon a bicycle 12 and should not limit the scope of the present invention.

As shown in FIGS. 1 through 6 of the drawings, a bracket 20 is provided that is attachable about the post 14 of the seat 16. The bracket 20 includes an attachment aperture 22 that adjustably surrounds the post 14 of the seat 16 thereby allowing vertical adjustment of the bracket 20. A fastener 24 threadably extends within the bracket 20 to within the attachment aperture 22 to engage the post 14 when the bracket 20 is properly positioned to prevent vertical or horizontal movement of the bracket 20 with respect to the post 14 of the bicycle 12.

Figure 2:
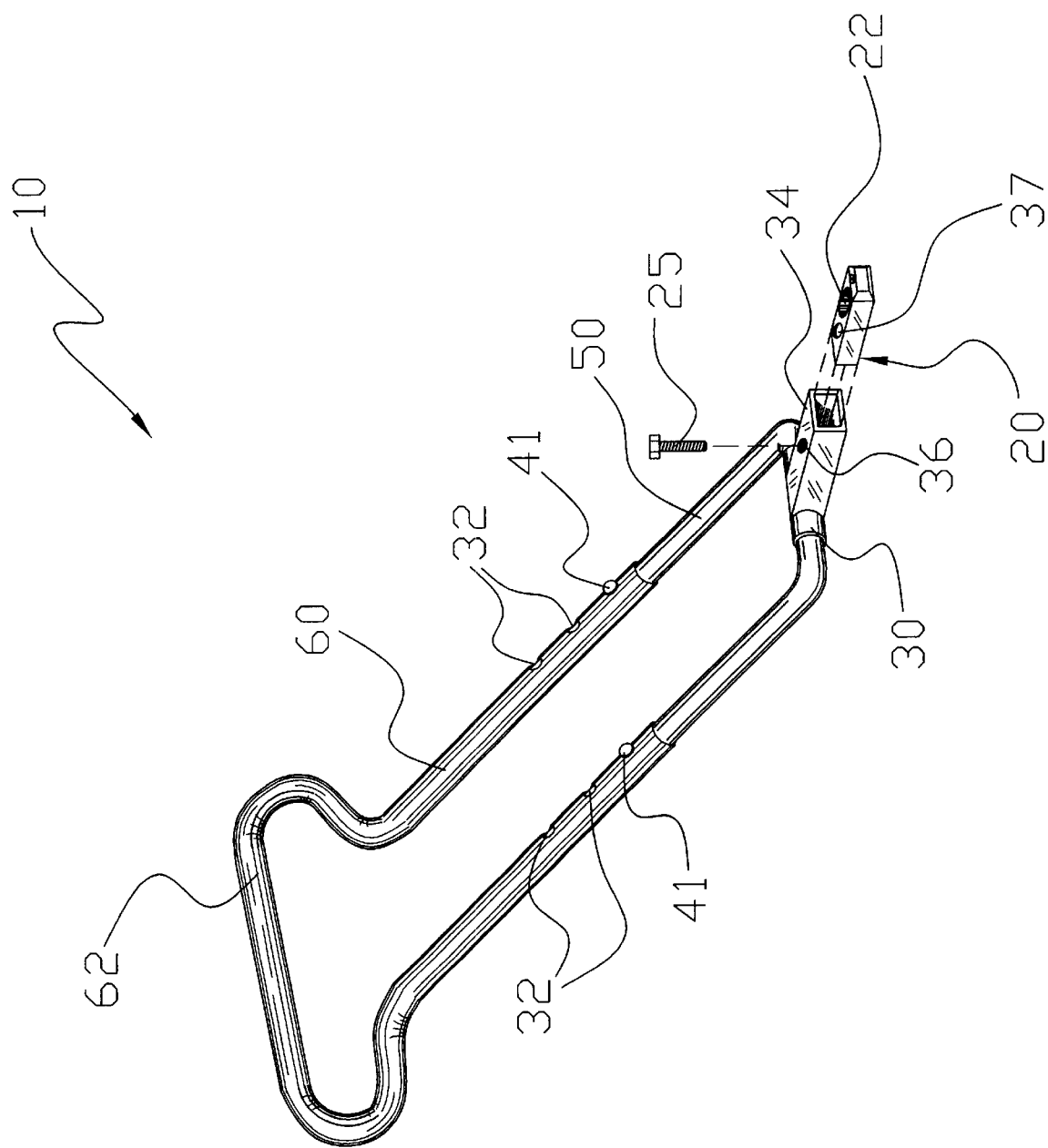
FIG. 2 is an exploded upper perspective view of the present invention.
Figure 3:
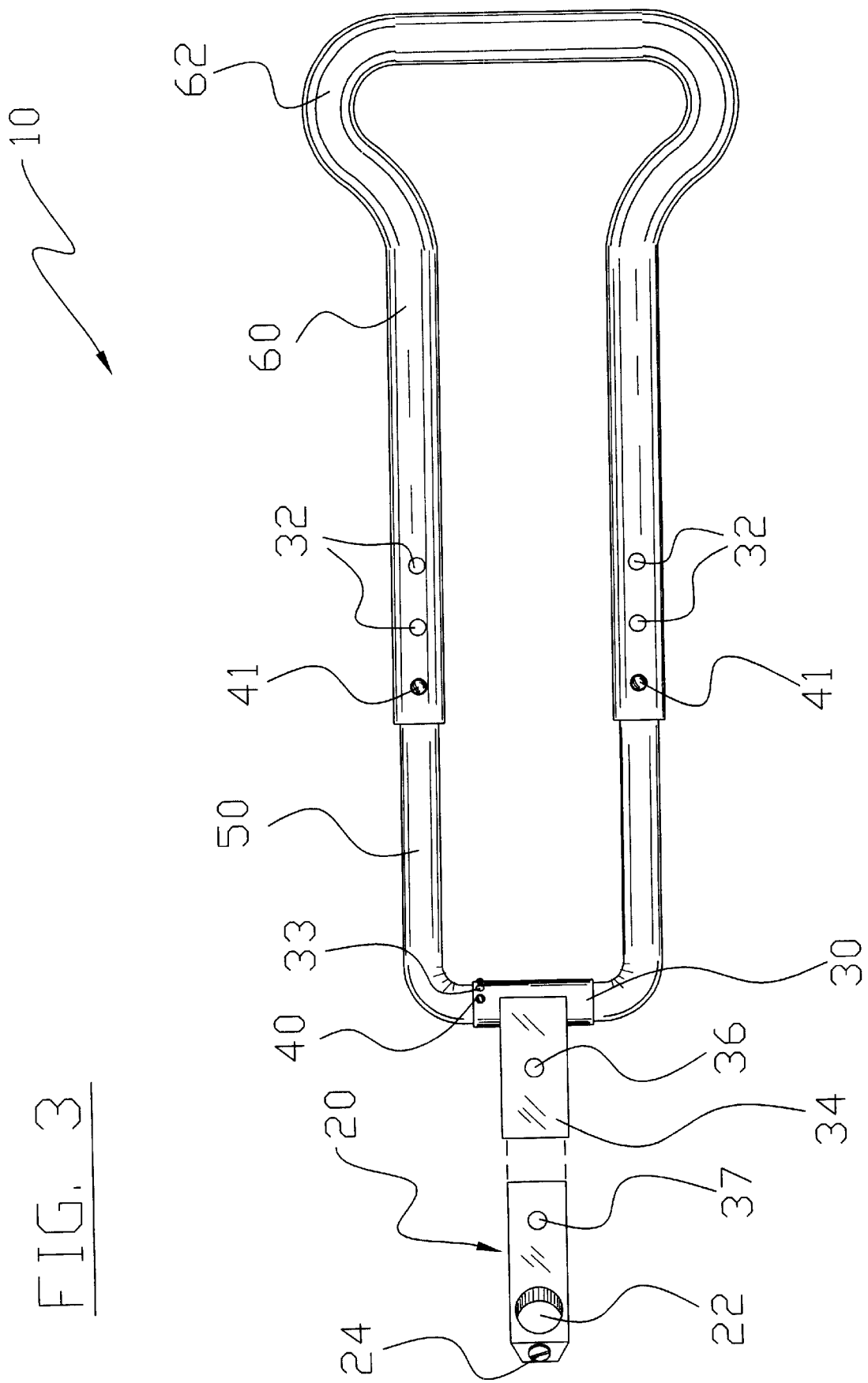
FIG. 3 is an exploded top view of the present invention.
Figure 4:
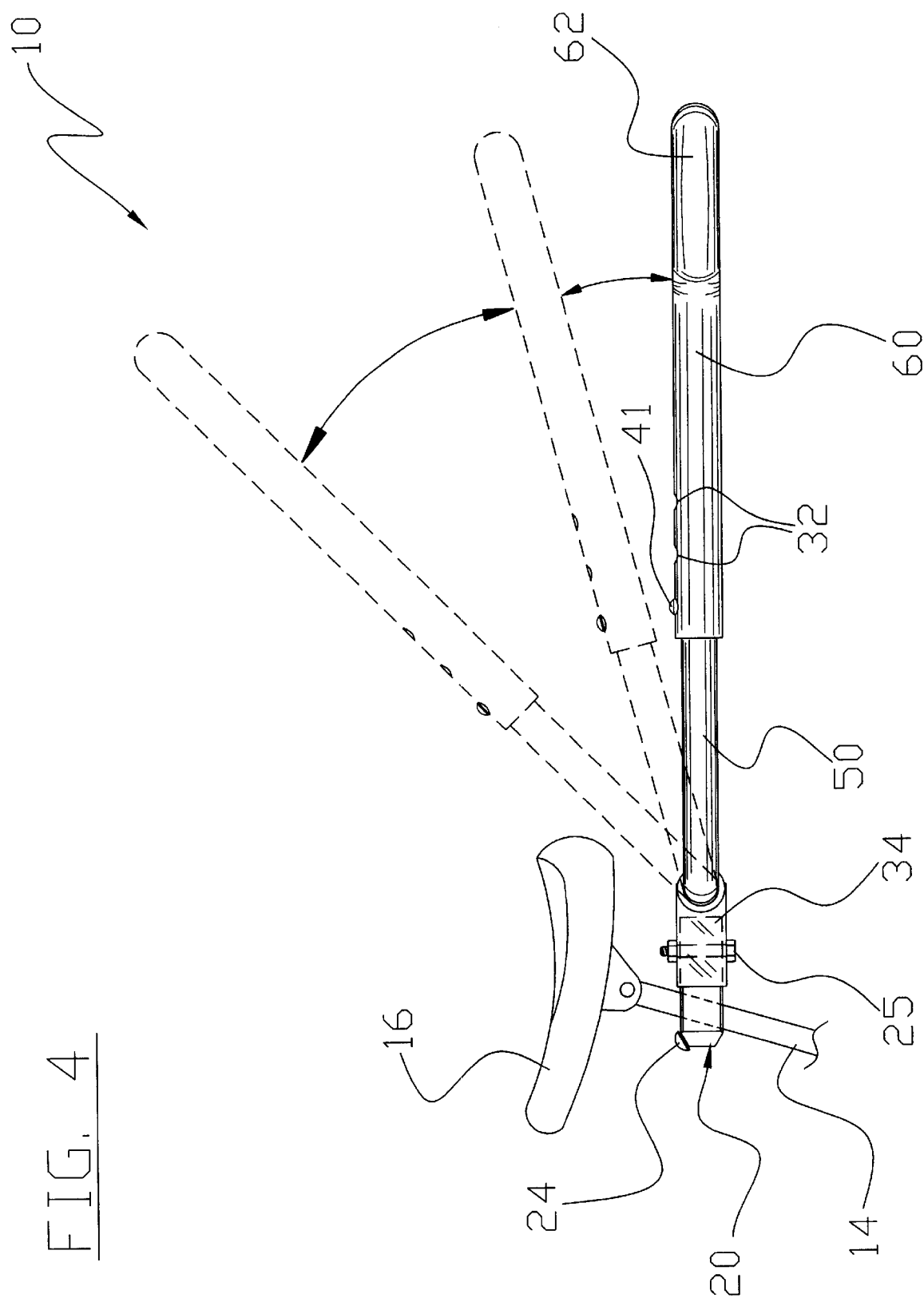
FIG. 4 is a side view of the present invention illustrating the range of pivotal movement for the handle.
Figure 5:
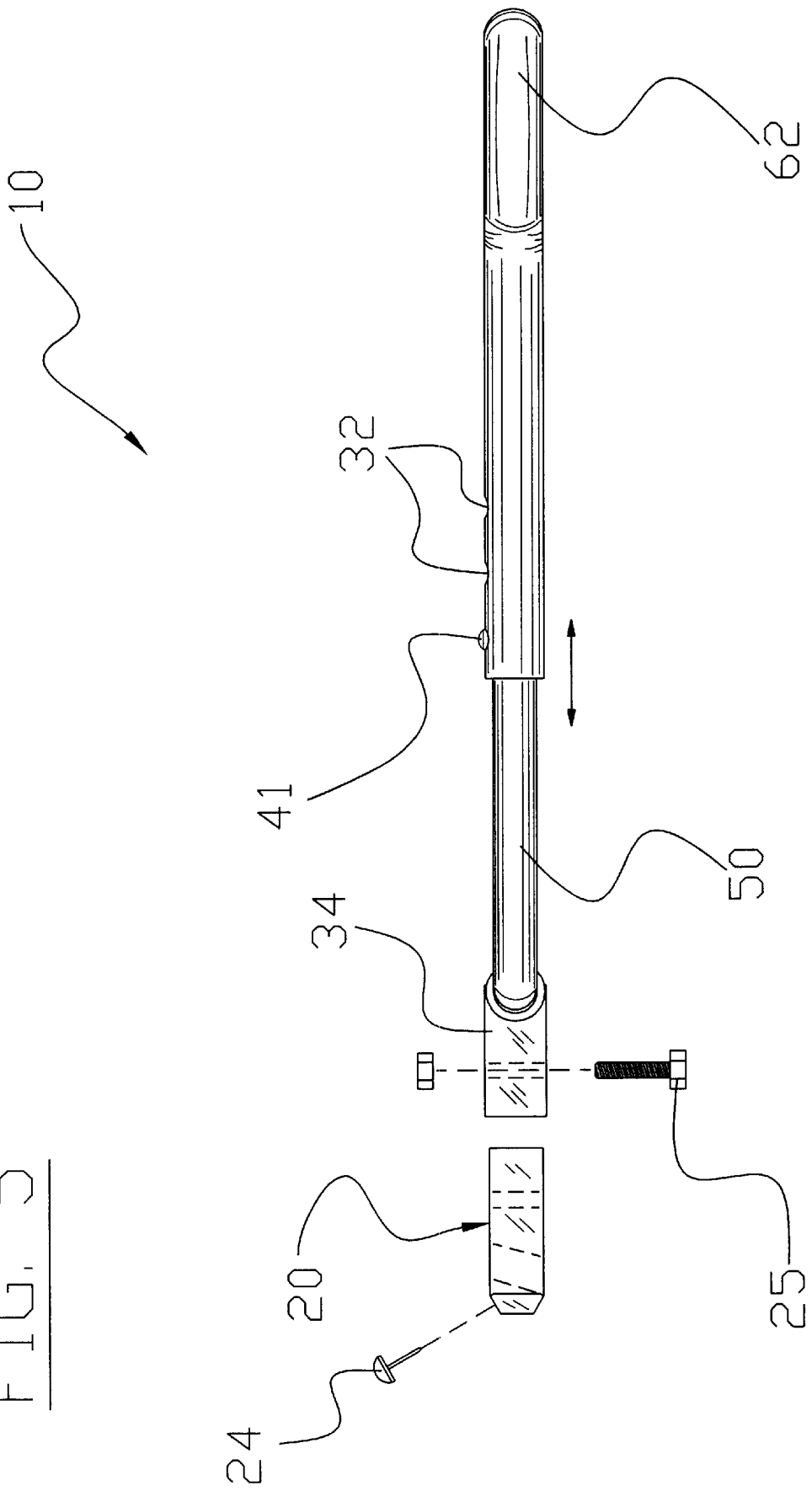
FIG. 5 is an exploded side view of the present invention.
Figure 6:
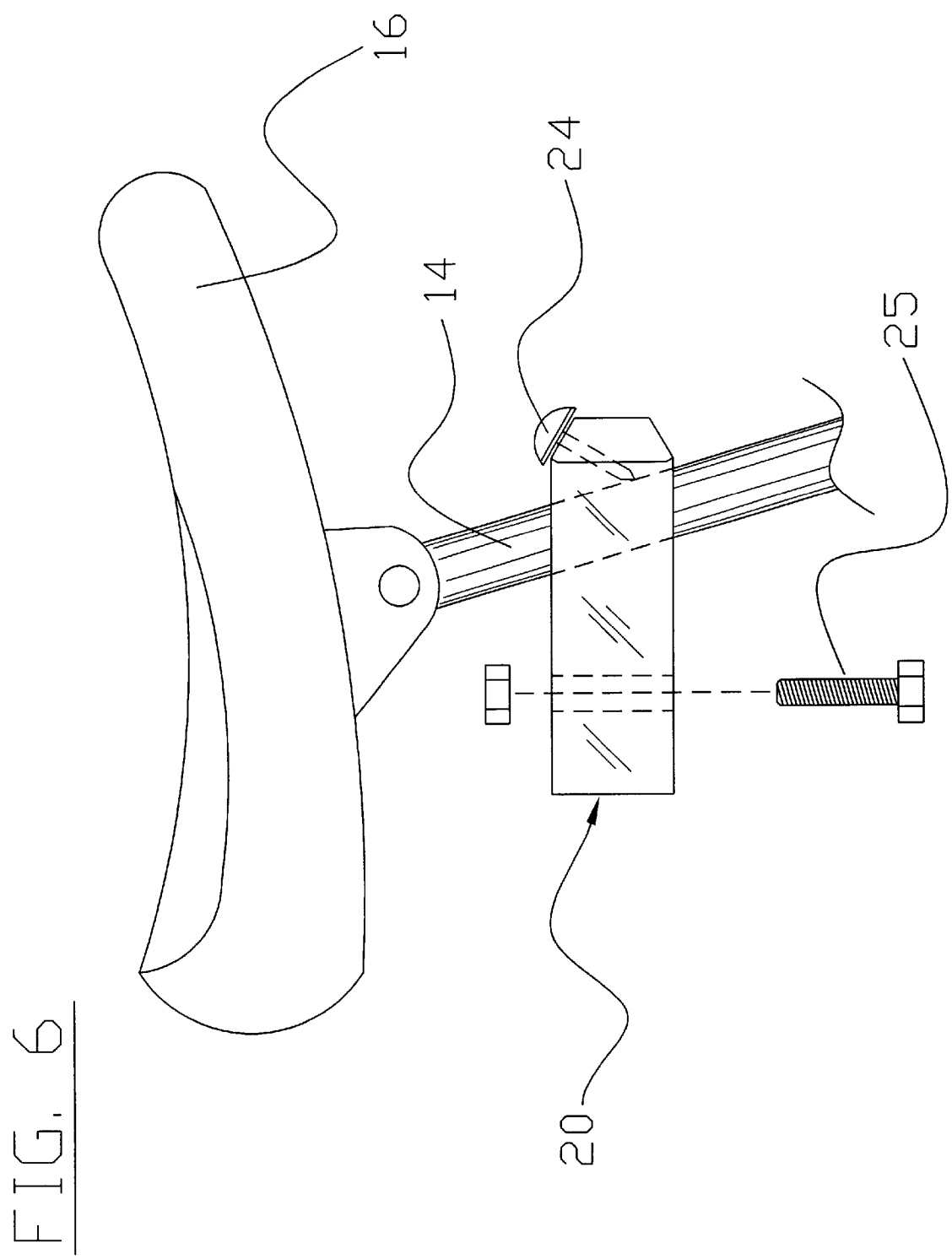
FIG. 6 is a magnified side view of the bracket attached to the seat post of a bicycle.
Figure 7:
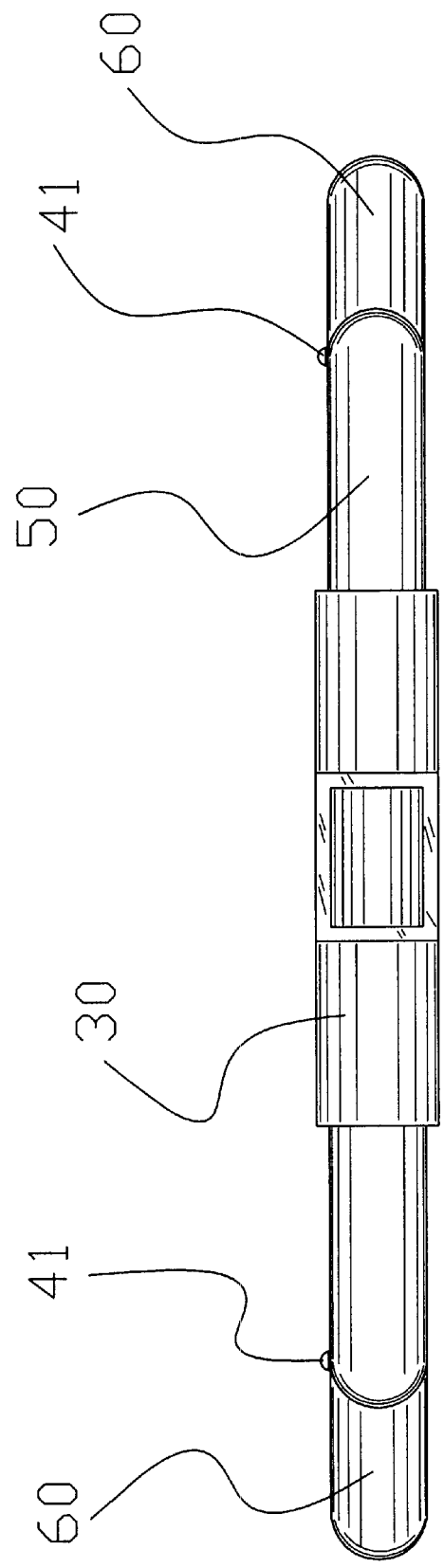
FIG. 7 is a front view of the present invention without the bracket.

As best illustrated in FIGS. 3, 4 and 6 of the drawings, the attachment aperture 22 preferably extends through the bracket 20 at an angle to provide a substantially horizontal position for the bracket 20 when attached to the post 14 of the bicycle 12. The angle of the attachment aperture 22 within the bracket 20 can be at various degrees as can be appreciated. As best shown in FIGS. 2 and 3 of the drawings, a connecting aperture 36 extends through the bracket 20 for receiving a fastener 24 to secure the connecting tube 34 about the bracket 20.

As shown in FIGS. 1 through 5 of the drawings, a connecting tube 34 is removably positionable about the bracket 20. The connecting tube 34 includes at least one first connecting aperture 36 that corresponds to second connecting aperture 37 of the bracket 20 for receiving a second fastener 25 to removably attach the connecting tube 34 about the bracket 20 as shown in FIGS. 1 through 5 of the drawings.

As best illustrated in FIG. 3 of the drawings, an adjustment tube 30 is attached orthogonally to the distal end of the connecting tube 34 opposite of the bracket 20. The adjustment tube 30 has a lumen that pivotally receives a mid-portion of the U-shaped member 50 as best shown in FIGS. 2 and 3 of the drawings. The adjustment tube 30 includes a plurality of second locking apertures 33 that receive a locking detent 40 from the U-shaped member 50 for allowing for the adjustment of the angle of the U-shaped member 50 and handle 60 with respect to the bracket 20 as shown in FIGS. 3 and 4 of the drawings.

As shown in FIGS. 1 through 5 of the drawings, the handle 60 is adjustably positioned upon the distal ends of the U-shaped member 50 for allowing for the adjustment of the overall length of the handle 60. The handle 60 preferably includes a broad portion 62 for providing easy gripping by a user. As with the adjustment tube 30, the handle 60 includes a plurality of second locking apertures 33 that receive at least one locking detent 40 for allowing for the catchably adjustment of the handle 60 with respect to the U-shaped member 50.

In an alternative embodiment, a brake handle may be attached to the handle 60 and mechanically connected to the brake system of the bicycle 12 to allow the user to slow the bicycle 12 down during operation without requiring significant physical exertion. An additional brake system may be added to the bicycle 12 to assist in the operation of the brake by the user.

In use, the user attaches the bracket 20 to the post 14 of the bicycle 12 at the desired height. The user then tightens the fastener 24 within the bracket 20 until the bracket 20 is immovably attached about the post 14. The user then attaches the connecting tube 34 about the bracket 20 with a fastener 24 positioned within each connecting aperture 36 within the bracket 20 and the connecting tube 34 to prevent removal of the connecting tube 34. The user then adjusts the angle of the U-shaped member 50 within the adjustment tube 30 and the length of the handle 60 with respect to the U-shaped member 50 by depressing the respective locking detent 40. When utilized to train a child to ride a bicycle 12, the user simply follows behind the bicycle 12 while guiding and balancing the bicycle 12 with the bicycle 12 balancing system 10. If a user is attempting to learn to utilize a skateboard or inline skates, a driver operates the bicycle 12 which in turn operates as a balancing structure for the user to utilize while learning to operate the skateboard or inline skates. Various other usages of the present invention may be achieved as can be appreciated by one skilled in the art.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed to be within the expertise of those skilled in the art, and all equivalent structural variations and relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A bicycle balancing system, comprising:
   a bracket attachable to a post of a bicycle;
   a connecting tube removably attached to said bracket;
   an adjustment tube attached to said connecting tube;
   a U-shaped member attached to said adjustment tube wherein said U-shaped member may be repositioned within said adjustment tube with a second locking means; and
   a handle attached to said U-shaped member, wherein said handle is adjustable in length with respect to the U-shaped member with a first locking means.

2. The bicycle balancing system of claim 1, wherein said second locking means is comprised of a detent structure.

3. The bicycle balancing system of claim 1, wherein said bracket includes an attachment aperture that slidably receives the post and a fastener threadably positioned within the bracket that engages the post to secure the bracket in a desired location.

4. The bicycle balancing system of claim 3, wherein said attachment aperture is angled to provide a substantially horizontal position for said bracket when attached to the post.

5. The bicycle balancing system of claim 1, wherein said handle is U-shaped.

6. The bicycle balancing system of claim 1, wherein said handle includes a broad portion.

7. The bicycle balancing system of claim 1, wherein said first locking means is comprised of a detent structure.

8. The bicycle balancing system of claim 1, including a brake structure attached to said handle and mechanically connected to the bicycle for operating at least one brake upon the bicycle.

* * * * *